United States Patent
Bechard et al.

(10) Patent No.: US 12,377,536 B1
(45) Date of Patent: Aug. 5, 2025

(54) IMITATION ROBOT CONTROL STACK MODELS

(71) Applicant: GOOGLE LLC, Mountain View, CA (US)

(72) Inventors: Paul Bechard, Ogdensburg, NY (US); Matthew Bennice, San Jose, CA (US); Joséphine Simon, San Francisco, CA (US); Jiayi Lin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 17/985,528

(22) Filed: Nov. 11, 2022

(51) Int. Cl.
 *B25J 9/16* (2006.01)
(52) U.S. Cl.
 CPC ............... *B25J 9/163* (2013.01); *B25J 9/161* (2013.01); *B25J 9/1671* (2013.01)
(58) Field of Classification Search
 CPC .......... B25J 9/163; B25J 9/161; B25J 9/1671
 See application file for complete search history.

(56) References Cited

U.S. PATENT DOCUMENTS

| | | | |
|---|---|---|---|
| 10,792,810 B1 | 10/2020 | Beckman et al. | |
| 11,524,402 B2 * | 12/2022 | Kolluri | B25J 9/1661 |
| 11,958,529 B2 * | 4/2024 | Mandlekar | G06N 3/088 |
| 2019/0314984 A1 * | 10/2019 | Gonzalez Aguirre | B25J 9/1664 |
| 2021/0049415 A1 * | 2/2021 | Whiteson | G06N 3/045 |
| 2021/0187733 A1 * | 6/2021 | Lee | G06N 3/008 |
| 2022/0035375 A1 * | 2/2022 | Rezaee | G06N 3/08 |
| 2023/0330846 A1 * | 10/2023 | Zhou | G06N 3/084 |
| 2024/0131705 A1 * | 4/2024 | Ye | B25J 9/163 |
| 2024/0148455 A1 * | 5/2024 | Donovan | A61B 34/30 |
| 2024/0149453 A1 * | 5/2024 | Kulläng | B25J 9/1671 |
| 2024/0185082 A1 * | 6/2024 | Jaegle | G06N 3/092 |

OTHER PUBLICATIONS

Hussein et al., Imitation Learning: A Survey of Learning Methods, Apr. 2017, ACM Computing Surveys, vol. 50, No. 2, Article 21, pp. 1-35 (Year: 2017).*

(Continued)

*Primary Examiner* — Sze-Hon Kong
(74) *Attorney, Agent, or Firm* — Gray Ice Higdon

(57) ABSTRACT

Implementations are provided for training an imitation robot control stack model to approximate the behavior of a robot control stack. In various implementations one or more training examples for training an imitation robot control stack model may be received. The training examples may comprise: input data to a robot control stack, wherein the input data comprises (i) a high-level command for controlling a robot, and (ii) current state data of the robot and an environment, and output data generated based on processing, by the robot control stack, the input data to the robot control stack, wherein the output data comprises a low-level command for controlling the robot according to the high-level command. The imitation robot control stack model may be trained based on the one or more training examples. Operation of the robot may be simulated based in part on controlling the operation of the robot using the trained imitation robot control stack model.

18 Claims, 5 Drawing Sheets

(56) References Cited

OTHER PUBLICATIONS

Hua et al., Learning for a Robot: Deep Reinforcement Learning, Imitation Learning, Transfer Learning, 2021, MDPI, Sensors 2021, 21, 1278, pp. 1-21 (Year: 2021).*
Chella et al., Learning high-level tasks through imitation, Oct. 9-15, 2006, Proceedings of the 2006 IEEE/RSJ International Conference on Intelligent Robots and Systems, pp. 3648-3654 (Year: 2006).*
Fang et al., Survey of imitation learning for robotic manipulation, Sep. 23, 2019, International Journal of Intelligent Robotics and Applications (2019) 3, pp. 362-369 (Year: 2019).*
Kober et al., Imitation and Reinforcement Learning, Jun. 2010, IEEE Robotics & Automation Magazine, pp. 55-62 (Year: 2010).*

* cited by examiner

IMITATION ROBOT CONTROL STACK MODELS

BACKGROUND

Robot control policies are trained to enable robots to navigate through environments autonomously, including interacting with (e.g., touching, engaging with, operating, dodging, etc.) objects perceived in those environments. These robot control policies often take the form of machine learning models, such as reinforcement learning policies. Training robot control policies can be costly and time consuming. While the robot control policies can be bootstrapped using imitation learning (IL), it is still necessary to further train the robot control policies via myriad training episodes of robot activity.

The resources required for training the robot control policies may be mitigated somewhat by simulating the robot's behavior during at least some of the training. However, accurately simulating the behavior of robots during training can still require substantial resources. For instance, a robot's control stack may be designed to be executed on the robot's hardware (which generally has relatively abundant computing resources). As such, executing a robot's control stack in simulation, whether fully or even in part, can consume large amounts of computing resources, increasing the time and/or computing power required for training robot control policies. Since training typically involves very large numbers of iterations of simulating the robot, the resources required to train the robot control policy (e.g. time taken to train) can expand dramatically. In some cases, a "high performance" control stack may be used during at least some of the training to reduce the resources needed during training. However, such a "high performance" control stack may require significant time, effort, and expertise to prepare by a developer. Furthermore, the accuracy of the "high performance" control stack may depend to some extent on the skill of the developer preparing it. In addition, there will almost certainly be a simulation-to-real ("sim-to-real") gap between any "high performance" control stack and a real robot control stack.

SUMMARY

Techniques are described herein for providing an imitation robot control stack model which is trained to approximate the behavior of a robot's control stack. Operation of the robot can then be simulated using the trained imitation robot control stack model. Some implementations are described herein for simulating operation of a robot using the trained imitation robot control stack model during training of the robot's control policy.

Techniques described herein give rise to various technical advantages and benefits. For instance, use of a trained imitation robot control stack model may enable accurate simulation of the robot with relatively little cost (e.g. in terms of computing resources, processing time, etc.). Furthermore, preparation of the imitation robot control stack model may primarily involve training a machine learning model, which can be largely automated and may require less skill and time than, for instance, manually preparing a "high performance" control stack. Whilst the imitation robot control stack model may not provide identical results to the robot control stack which it is trained to approximate, the results may be "close enough" for the purposes of, for instance, training a robot control policy.

Additionally, an imitation control stack may be trained to encode phenomena and/or impulses other than motor control. For example, an imitation robot control stack can be trained to encode physics responses (e.g., robot movement for navigation). When the imitation control stack is trained in this manner, its later use may conserve not only resources that would have been expended for a real or "high performance" control stack, but also may conserve resources that would otherwise have been spent simulating physics responses for the robot's body.

Robot control stacks are generally configured to process a high-level command for the robot and state information about the robot and the environment and provide, as output, a low-level command to operate the robot according to the high-level command. As an example, a robot control stack may be provided with a high-level command to move an arm to a particular pose from a current pose. The control stack may then process this command, and generate, as output, instructions for various components (e.g. by providing signals to actuators) to implement the high-level command and move the arm from the current pose to the particular pose. In particular, the control stack may determine motor positions for joints in the robot and the arm in order to cause the arm to be moved from the current pose to the particular pose.

The robot control stack may include a number of processes. For instance, the robot control stack may include processes such as self-collision checks or generation of 3 dimensional representations of the robot and/or the surrounding environment (e.g. 3D voxel map construction). Furthermore, the robot control stack may take into consideration hardware constraints of components of the robot. For instance, the control stack may be configured based on a clock speed of a controller. However, the results of such processes and such constraints may not substantially impact the behavior of the robot during simulation, nor indeed the effectiveness of training a robot control policy using the robot control stack. Use of an imitation robot control stack model, which may be trained based on the inputs and outputs of the control stack, may allow for accurate simulation of a robot, whilst reducing complexity and not being limited by the hardware constraints of the robot.

The imitation robot control stack model may be trained to approximate a robot control stack (e.g. a full or partial control stack to be used on a robot, a manually created "high performance" control stack, etc.). Training examples can be generated based on input data and output data generated by the robot control stack in response to the input data. The input data may comprise a high-level command and current state data of the robot and the environment. The output data may comprise a low-level command for controlling the robot according to the high-level command. The training examples may be generated based on prior simulation of the robot control stack, and/or on prior operation of a real world robot using the robot control stack. The imitation robot control stack model may then be trained based on the training examples. For instance, the imitation robot control stack model may be trained using reinforcement learning (RL), such that when the imitation robot control stack model closely imitates the output of the robot control stack in response to the same input, a reward is used to train the imitation robot control stack model.

In some implementations, the imitation robot control stack model may instead be trained to approximate a next state of the robot and the environment. For instance, the robot control stack may be used to generate a low-level command in response to given input data. A next state of the robot and the environment, if the robot is operated according to the low-level command, may then be determined. The next state may be determined by simulating the robot. Simulating the robot may comprise, for instance, use of a simulation framework and a simulation engine. The simulation framework may enable the operation of specific components of the robot to be simulated. For instance, the simulation framework may simulate the operation of a motor controller, taking into consideration its real-life constraints, in response to a particular low-level command. The simulation engine may determine the physical changes to the robot and the environment as a result of the operation of the robot, for instance using a physics rendering engine. Training examples can then be generated based on the given input data and the next state. The imitation robot control stack may be trained based on these training examples. Training the imitation robot control stack model in this way may enable accurate approximation of a next state of a robot in response to input data, without having to execute aspects of the robot control stack, simulation framework and simulation engine which may be less relevant to, for instance, training a robot control policy.

Robot control policies are generally configured for selecting actions to be performed by a robot interacting with an environment to perform a robotic task, such as opening a door, picking up an object and placing it down, and so on. In particular, a robot control policy may be configured to receive, as input, an observation, i.e., data characterizing a state of the environment, and to process the observation to generate an output indicative of a probability distribution over possible actions to be performed by the robot in response to the observation. The high-level commands provided to the robot control stack may be based on the selected action(s) provided by the robot control policy in order to implement the selected action(s) by the robot. The robot control policies may be trained based on whether the selected action(s) lead towards performance of a given robot task. For instance, the robot control policy may be trained using RL over a large number of iterations, such that when the robot control policy selects an action which leads towards performance of a given robot task, a reward is used to train the robot control policy. In some implementations, a robot control policy can be trained with at least some of the iterations involving simulating the operation of the robot using the trained imitation robot control stack model. As discussed herein, simulating operation of the robot using the trained imitation robot control stack model may be relatively low cost. As such, use of the imitation robot control stack model during training of the robot control policy may require significantly less resources.

In various implementations, a method may be implemented using one or more processors and may include: receiving one or more training examples for training an imitation robot control stack model, each of the one or more training examples comprising: input data to a robot control stack, wherein the input data comprises (i) a high-level command for controlling a robot, and (ii) current state data of the robot and an environment, and output data generated based on processing, by the robot control stack, the input data to the robot control stack, wherein the output data comprises a low-level command for controlling the robot according to the high-level command, training the imitation robot control stack model based on the one or more training examples; and simulating operation of the robot based in part on controlling the operation of the robot using the trained imitation robot control stack model.

In various implementations, the method may include training a robot control policy for the robot based on the simulated operation. In various implementations, training the imitation robot control stack model may include performing reinforcement learning to train the imitation robot control stack model based on rewards or penalties determined from whether a particular low-level command determined by the imitation robot control stack model is within a threshold similarity to a corresponding low-level command generated by the robot control stack based on the same high-level command.

In various implementations, training the imitation robot control stack model may include performing reinforcement learning to train the imitation robot control stack model based on rewards or penalties determined from whether a next state of the robot and the environment if the robot is controlled according to a particular low-level command determined by the imitation robot control stack model is within a threshold similarity to a corresponding next state if the robot is controlled according to a low-level command generated by the robot control stack based on the same high-level command.

In various implementations, the robot may include a plurality of components controlled by the robot control stack, and the imitation robot control stack model may be trained to determine, based on processing an input high-level command and current state data of the robot and the environment, a low-level command for controlling a subset of the plurality of components of the robot according to the high-level command. In various implementations, simulating operation of the robot may include controlling the operation of the simulated robot using the trained imitation robot control stack model and at least one additional trained imitation robot control stack model. In various implementations, the at least one additional imitation robot control stack model may have been trained to determine, based on processing an input high-level command and current state data of the robot and the environment, a low-level command for controlling a second subset of the plurality of components of the robot according to the high-level command.

In various implementations, training the robot control policy may include simulating operation of the robot based in part on controlling the operation of the robot using the robot control stack. In various implementations, training the robot control policy may include a first training stage and a second training stage following the first training stage, wherein a proportion of training using the imitation robot control stack model in the first training stage is higher than a proportion of training using the imitation robot control stack model in the second training stage.

In various implementations, training the robot control policy may include simulating operation of a plurality of robots based in part on controlling the operation of each one of the plurality of robots using the trained imitation robot control stack model. In various implementations, training the robot control policy may include simulating operation of a second robot based in part on controlling the operation of the second robot using a corresponding second trained imitation robot control stack model.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
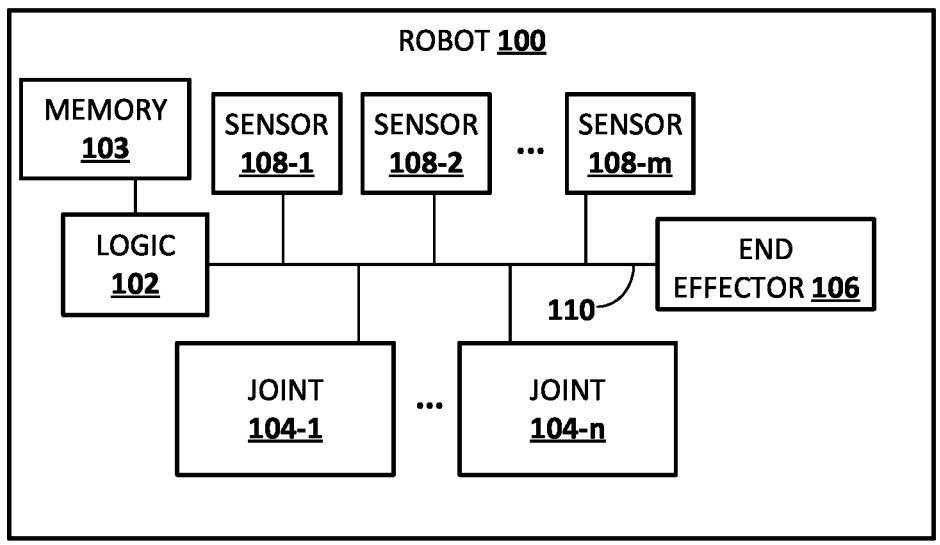
FIG. 1A schematically depicts an example environment in which disclosed techniques may be employed, in accordance with various implementations.

FIG. 1A is a schematic diagram of an example environment in which selected aspects of the present disclosure may be practiced in accordance with various implementations. The various components depicted in FIG. 1A, particularly those components forming a simulation system 130, may be implemented using any combination of hardware and software. In some implementations, robot 100 may be in communication with simulation system 130.

Figure 1B:
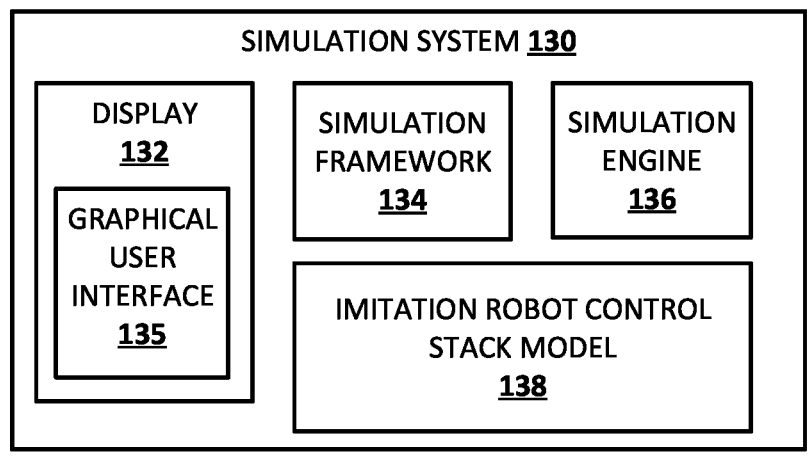
FIG. 1B depicts an example robot, in accordance with various implementations.

Robot 100 may take various forms, including but not limited to a telepresence robot (e.g., which may be as simple as a wheeled vehicle equipped with a display and a camera), a robot arm, a multi-pedal robot such as a "robot dog," an aquatic robot, a wheeled device, a submersible vehicle, an unmanned aerial vehicle ("UAV"), and so forth. One non-limiting example of a mobile robot arm is depicted in FIG. 1B. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random-access memory ("RAM"), dynamic RAM ("DRAM"), read-only memory ("ROM"), Magnetoresistive RAM ("MRAM"), resistive RAM ("RRAM"), NAND flash memory, and so forth. In some implementations, a robot controller may include, for instance, logic 102 and memory 103 of robot 100.

In some implementations, logic 102 may be operably coupled with one or more joints 104-1 to 104-$n$, one or more end effectors 106, and/or one or more sensors 1081-$m$, e.g., via one or more buses 110. As used herein, "joint" 104 of a robot may broadly refer to actuators, motors (e.g., servo motors), shafts, gear trains, pumps (e.g., air or liquid), pistons, drives, propellers, flaps, rotors, or other components that may create and/or undergo propulsion, rotation, and/or motion. Some joints 104 may be independently controllable, although this is not required. In some instances, the more joints robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners (e.g., light detection and ranging, or "LIDAR") or other 3D vision sensors (e.g., stereographic cameras used to perform stereo visual odometry) configured to provide depth measurements, two-dimensional cameras (e.g., RGB, infrared), light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, Geiger counters, and so forth. While sensors 1081-$m$ are depicted as being integral with robot 100, this is not meant to be limiting.

In some implementations. simulation system 130 may include one or more computing devices cooperating to perform selected aspects of the present disclosure. An example of such a computing device is depicted schematically in FIG. 5. In some implementations, simulation system 130 may include one or more servers forming part of what is often referred to as a "cloud" infrastructure, or simply "the cloud."

Various modules or engines may be implemented as part of simulation system 130 as software, hardware, or any combination of the two. For example, in FIG. 1A, simulation system 130 includes a display interface 132 that is, e.g., configured to render a graphical user interface ("GUI") 135. A user may interact with GUI 135 to trigger and/or control aspects of simulation system 130, e.g., to control a simulation engine 136 that simulates robot 100 and a virtual environment.

Simulation engine 136 may be configured to simulate robot 100 and a virtual environment. The virtual environment may include virtual object(s) which may be simulated and observed by one or more virtual sensors that correspond to one or more physical sensors 108 of robot 100. For example, simulation engine 136 may be configured to simulate a 3D environment that includes one or more virtual objects. The virtual objects may include, for instance, obstacles to be avoided and/or traversed by robot 100, items to be picked up, placed, or otherwise manipulated by robot 100, and other robots whose operation may or may not also be simulated. Note that the virtual environment need not be rendered visually on a display. In many cases, the virtual environment (also referred to herein as a "simulated environment") may be simulated without any visual representation being provided on a display as output. Based on pose information determined based on, for instance, information indicative of a real world pose or a simulated pose, simulation engine 136 may simulate corresponding virtual sensor(s) in the simulated environment.

Simulation engine 136 may be further configured to provide sensor data that is generated from a perspective of at least one of the virtual sensors that is simulated in the simulated space. As an example, suppose a virtual vision sensor is pointed in a direction of a particular virtual object in the virtual environment. Simulation engine 136 may generate and/or provide simulated vision sensor data that depicts the particular virtual object as it would appear from the perspective of the simulated vision sensor in the virtual environment.

Simulation framework 134 may be configured to simulate operation of specific components of robot 100. For instance, the simulation framework 134 may process a low-level command directed to controlling a motor controller of robot 100. The low-level command may, for instance, comprise a signal to be sent to the motor controller which causes the motor controller to perform a specific operation (e.g. rotate clockwise 10 degrees). Based on this, the simulation framework 134 may simulate the operation of the motor controller. Simulation of the components of robot 100 by the simulation framework 134 may take into consideration real-life constraints of the respective components. For instance, in the case of a motor controller, the simulation framework 134 may take into consideration a maximum rotational speed of a respective motor the motor controller is configured to control. The limitations may be, for instance, physical limitations of the particular components being simulated, or may be enforced limitations, for instance, for safety reasons.

Simulation engine 136 may be configured to simulate the physical movement of robot 100 based on simulation of the specific components of robot 100 by simulation framework 134. For instance, for a given component of robot 100, simulation engine 136 may determine, based on an initial position of the component at a first time, a position of the component in space at a second time after the first time. The position of each component of robot 100 may be determined at particular intervals (e.g. every 0.1 seconds, every 1 second, etc.). The position of the component at the second time may be determined based on modeling physical parameters (e.g. gravity, friction, air resistance, tensile strength, etc.). Simulation engine 136 may include a physics rendering engine (not depicted) for this purpose. Positions and characteristics of one or more of the virtual objects in the virtual environment may also be simulated, for instance, based on whether the virtual objects are interacted with by robot 100.

Imitation robot control stack model 138 may be usable to imitate a robot control stack for robot 100. The robot control stack may be, for instance, executed by the robot controller of robot 100 during real world operation of robot 100 to, in response to high-level commands (e.g. move end effector to X, Y, Z), generate low-level commands (e.g. control joint 1 to move A degrees, control joint 2 to move B degrees, etc.) to implement the high-level commands. The high-level commands may be determined by robot 100 based on, for instance, one or more actions output by a control policy which may also be executed by the robot controller. Similarly, during simulation, the imitation robot control stack model 138 may be applied to high-level commands (and state data) to generate low-level commands. The low-level commands may then be used by the simulation framework in simulating the behavior of robot 100. In some implementations, the imitation robot control stack 138 may be trained so that it can be used to imitate output of the simulation framework (e.g. parameters indicative of a simulated operation of particular components), and/or parts of the simulation engine (e.g. position information of each of the components at a second time).

FIG. 1B depicts a non-limiting example of a robot 100 in the form of a robot arm. An end effector 106 in the form of a gripper claw is removably attached to a sixth joint 1046 of robot 100. In this example, six joints 104-1 to 104-6 are indicated. However, this is not meant to be limiting, and robots may have any number of joints. In some implementations, robot 100 may be mobile, e.g., by virtue of a wheeled base 165 or other locomotive mechanism. Robot 100 is depicted in FIG. 1B in a particular selected configuration or "pose".

Figure 1B:
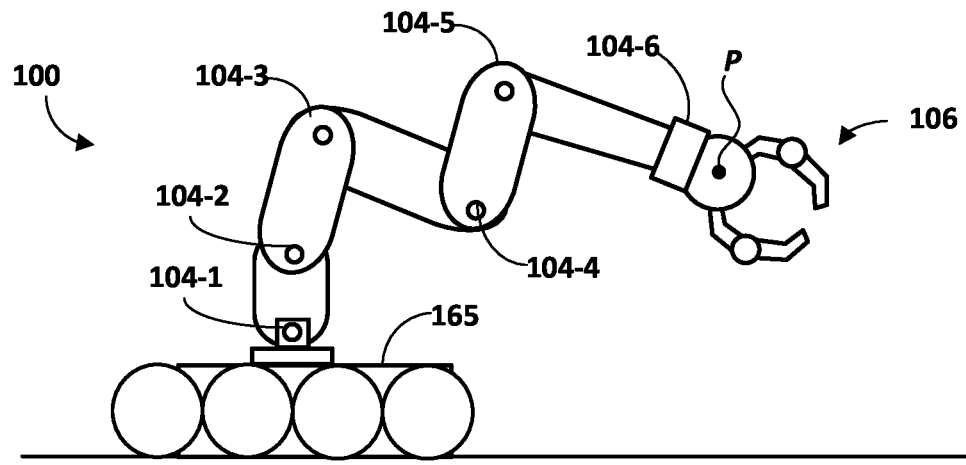
Figure 2:
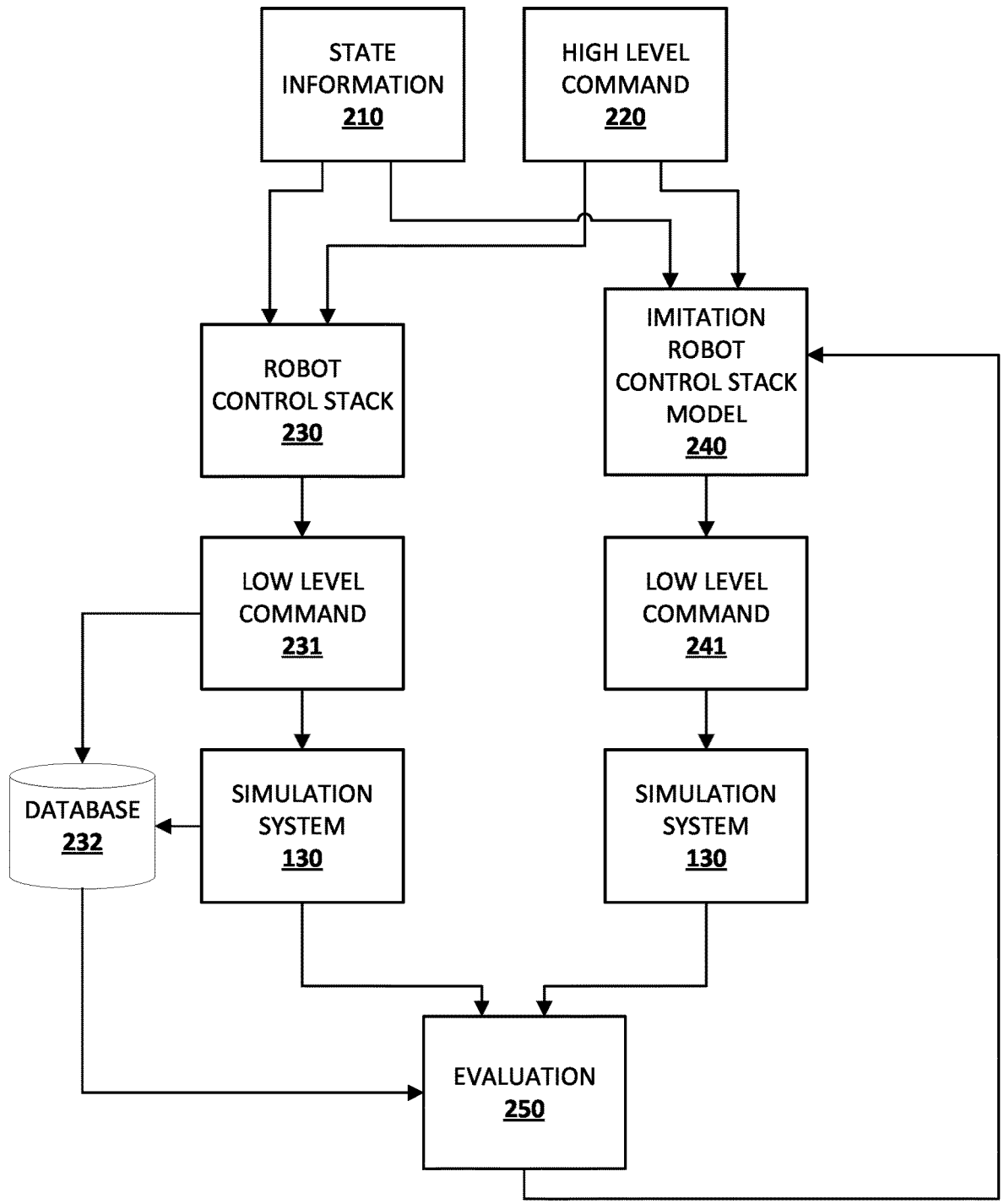
FIG. 2 schematically depicts an example of how an imitation robot control stack model may be trained.

FIG. 2 schematically depicts an example of how an imitation robot control stack model 240 may be trained. Imitation robot control stack model 240 in FIG. 2 may share various characteristics and/or correspond to element 138 in FIG. 1. Training the imitation robot control stack model 240 may involve comparing the behavior of the imitation robot control stack model 240 with a number of training examples indicative of behavior of a control stack 230. The training examples may be generated by observing the behavior of a robot control stack 230. The robot control stack 230 may be, for instance, a full or partial robot control stack configured to be used on a real world robot, such as robot 100.

A high-level command 220 and state information 210 indicative of a current state of a robot and an environment may be provided to a robot control stack 230. The state information may be based on, for instance, sensor data and/or prior knowledge of the state of the robot and the environment. For instance, the state information may indicate the current pose of the robot. As additional non-limiting examples, the state information may include 2D or 3D imagery depicting the robot's environment, may indicate whether the robot is close to an obstacle (e.g. such that the robot may come into contact with the obstacle such as a wall), or may whether the robot is presently interacting with an object (e.g. holding an object). The state information 210 may be generated based on previous real world operation of robot 100, generated based on simulated operation of robot 100, generated by another computing device (e.g. with user input), etc. Similarly, the high-level command 220 may be generated based on previous real world operation of robot 100, generated based on simulated operation of robot 100, generated by another computing device (e.g. with user input), etc.

Based on processing the state information 210 and the high-level command 220, the robot control stack 230 may provide one or more low-level commands 231. The low-level command(s) 231 may be provided to implement the high-level command 220 by robot 100. The low-level command(s) 231 may be generated during real world operation of robot 100 and/or simulated operation of robot 100.

The pair of input data (i.e. state information 210 and high-level command 220) and respective output data (i.e. low-level command(s) 231) may be considered to form a training example. The training example may be stored in database 232 for later use, or may be used directly for evaluating the performance of the imitation robot control stack model 240, as described below. As mentioned, the training examples may be based on real world operation of robot 100 and/or on simulated operation of robot 100.

In some implementations, the low-level command 231 may be used by simulation system 130 to predict information indicative of the next state of robot 100 and the environment. In some other implementations, during previous real world operation of robot 100, information indicative of the next state may be received, for instance, based on sensor data. As such, the training example may include information indicative of a next state of robot 100 and the environment instead of or in addition to the low-level command 231.

Database 232 may store a plurality of training examples which may be used, for instance, for training the imitation robot control stack model 240. The training examples stored by database 232 may include training examples generated from real world operation of robot 100, simulated operation of robot 100, or a combination thereof. Database 232 may be hosted, for instance, on the same computing device which performs the training of an imitation robot control stack model, on a remote computing device, etc. Although reference is generally made to training examples from operation of robot 100, it will be appreciated that training examples may be additionally or alternatively be retrieved from other real and/or simulated robots (including e.g. robots of different models).

Similarly to the robot control stack 230, the imitation robot control stack model 240 may, based on processing state information 210 and high-level command 220, may be used to generate a predicted or inferred low-level command 241. The state information 210 and high-level command 220 may, for instance, be retrieved from a particular training example. The imitation robot control stack model 240 may be a machine learning model of any suitable architecture, trained in any suitable manner. For instance, the imitation robot control stack model 240 may be a neural network trained using reinforcement learning. When the imitation robot control stack model 240 is adequately trained, the low-level command 241 prediction should approximate the low-level command 231 output by the robot control stack 230 in response to the same input state information 210 and high-level command 220. During training of the imitation robot control stack model 240, any difference between the predicted low-level command 241 and the "ground truth" low-level command 231 may be used as an error (e.g., a penalty) to train the imitation robot control stack model 240, e.g., using techniques such as stochastic gradient descent and/or back propagation.

In some implementations, the low-level command 241 output by the imitation robot control stack model 240 may be used in generating information indicative of a next state of robot 100 and the environment. For instance, as illustrated in FIG. 2, low-level command 241 may be used by simulation system 130 to predict information indicative of the next state of robot 100 and the environment. Predicting the information indicative of a next state of robot 100 and the environment may comprise, for instance, simulating operation of robot 100 based on low-level command 241, and the resulting impact on the environment (e.g. if an object has been moved). In this way, comparison with training examples including information indicative of a next state can be performed.

In some implementations, the imitation robot control stack model 240 may be trained to approximate information indicative of a next state. As such, rather than providing a low-level command 241 which may be used by simulation system 130 to provide information indicative of a next state, the imitation robot control stack model 240 may directly provide information indicative of the next state. In this way, various aspects of the simulation system 130 need not be executed, saving time and computing resources.

The performance of the imitation control stack model 240 may be evaluated in an evaluation stage 250 based on a comparison of training examples and behavior of the imitation robot control stack model 240. For instance, given the same state information 210 and high-level command 220, output of the imitation robot control stack model 240 (e.g. low-level command 241, information indicative of a next state generated by simulation system 130, information indicative of a next state generated directly by imitation robot control stack model 240, etc.) and output from the robot control stack (e.g. low-level command 231, information indicative of a next state generated by simulation system 130, etc.) may be compared. In particular, it may be determined whether the respective outputs are within a threshold level of similarity. Similarly, it may be determined whether the respective outputs are greater than a threshold level of difference. The results of such a comparison may then be used to train the imitation robot control stack model 240, which as mentioned previously may include stochastic gradient descent, back propagation, etc.

In some implementations, the imitation robot control stack model 240 may be trained using reinforcement learning. As such, when the output of the imitation robot control stack model 240 is within a threshold similarity of the output data of a respective training example (i.e. having the same input data), a reward may be determined to be used as feedback to train the imitation robot control stack model 240. In other implementations, the imitation robot control stack 240 may be trained based on an error or difference between output of the imitation robot control stack 240 and output of a respective training example (i.e. having the same input data), e.g., using techniques such as stochastic gradient descent, back propagation, etc. In some implementations, the type of training may depend on the context in which the imitation robot control stack 240 will operate, e.g., a stack trained specifically for navigation versus a stack trained specifically for robot arm control.

In some implementations, robot 100 may comprise a plurality of components controlled by the robot control stack 230, for instance, as illustrated in FIG. 1B. In this case, the imitation robot control stack model 240 may be trained to predict a low-level command 241 for controlling a subset of the plurality of components of the robot 100 according to the high-level command 220. For instance, the training examples used to train the imitation robot control stack model 240 may relate exclusively (or primarily) to the subset of components. As an example, the training examples may relate exclusively (or primarily) to locomotion of robot 100 via wheeled base 165, and therefore the imitation robot control stack model 240 may be trained in respect of the wheeled base 165.

Additionally or alternatively, the imitation robot control stack model 240 may be trained to output a low-level command 241 in respect of the subset of components, and evaluation 250 of the behavior of the imitation robot control stack model 240 may be in respect of the subset of components. In addition, there may be a plurality of imitation robot control stack models 240 which are each trained to provide low-level commands 241 for different subsets of the plurality of components. In some implementations there may be a single interface which allows for each of the plurality of imitation robot control stack models 240 to be used to control the operation of a plurality of components of the robot 100. In this way, since a particular imitation robot control stack model 240 is concerned only with a subset of components of robot 100, training may require fewer resources. In addition, depending on the particular application in which the robot 100 is being simulated, it may not be necessary to simulate all of its components. As such, providing an imitation robot control stack model 240 which can be used to simulate operation of the robot 100 in respect of the relevant components only may simplify the simulation, thereby requiring fewer resources.

Figure 3:
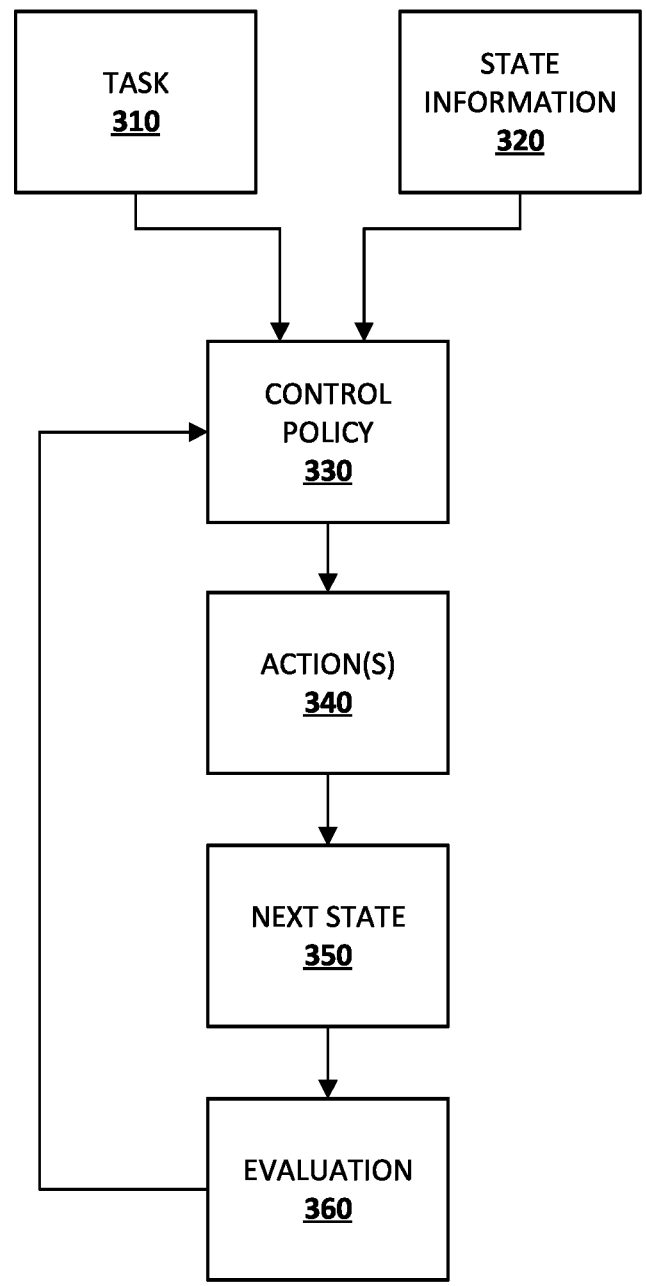
FIG. 3 schematically depicts an example of how a robot control policy may be trained.

FIG. 3 schematically depicts an example of how a robot control policy 330 may be trained. The robot control policy 330 may be trained to provide one or more actions 340 to be performed by a robot to complete a task 310, given particular state information.

The task 310 may be determined based on, for instance, user input, or by another computing device. The task 310 may comprise, for instance, traveling to a particular location, opening a door, picking up an object, etc.

The state information 320 may be largely the same as described for the state information 210. For instance, the state information 320 may be indicative of a current state of robot 100 and the environment. State information 320 may be based on, for instance, simulated or real-world sensor data, and/or prior knowledge of the state of robot 100 and the environment.

As described, the robot control policy 330 may determine one or more actions 340 to be performed to complete task 310 given state information 320. Robot control policy 330 may be, for instance, a machine learning model such as a neural network. As such, robot control policy 330 may be used to process the task 310 and state information 320 to generate a probability distribution over an action space of robot 100. Robot 100 may then select its next action based on that probability distribution. These actions 340 and their outcomes (e.g. a next state 350) may form robot training episodes that are usable to train the robot control policy 330. For instance, if it is determined that the next state 350 causes the completion of task 310 to be progressed at the evaluation stage 360, that episode may be used as a reward for training the robot control policy 330 using reinforcement learning. The evaluation may be performed, for instance, by an evaluator model trained to determine feedback to train the control policy based on whether completion of the task is considered to be progressed.

The next state 350 of the robot 100 and the environment may be determined by simulating the results of the action(s) 340 output by the robot control policy 330, for instance using simulation system 130. For instance, the action(s) may be used to determine one or more high-level commands 220, which can be fed into robot control stack 230 and/or processed using trained imitation robot control stack model 138. The next state 350 can then be predicted accordingly.

In some implementations, at least some of the training of the control policy 330 involves determining the next state 350 based on using the trained imitation robot control stack model 138. As mentioned above, processing using trained imitation robot control stack model 138 may require fewer resources (e.g. time, computing resources, etc.) than equivalent processing with robot control stack and/or simulation system 130. As such, in this way, the robot control policy can be trained with relatively low cost.

In some implementations, training of the robot control policy 330 involves determining the next state 350 in at least some training episodes using the trained imitation robot control stack model 138 and determining the next state 350 in at least some of the other training episodes using the robot control stack 230. The use of the trained imitation robot control stack model 138 and the robot control stack 230 may be determined according to a particular proportion (e.g. out of 100 training episodes, 90 may be determined to use the trained imitation robot control stack model 138 and 10 may be determined to use robot control stack 230). The particular training episodes which use the trained imitation robot control stack model 138 or the robot control stack 230 may be selected at random (e.g. using a random number generator).

In some implementations, the proportion may be changed, for instance, based on whether it is determined that training has plateaued with the current proportion. For instance, the robot control policy 330 may initially be trained with a first proportion (e.g. where 90% of the training episodes use the trained imitation robot control stack model 138) and later trained with a second proportion (e.g. where 75% of the training episodes use the trained imitation robot control stack model 138). In this way, the robot control policy 330 can be trained at a relatively low cost, at least initially, whilst also allowing for training using the higher fidelity robot control policy. In some implementations the next state 350 may additionally or alternatively be determined based on real world operation of the robot during training of the robot control policy 330 in at least some of the training episodes.

In some implementations, training the robot control policy 330 may comprise simulating operation of a plurality of robots based in part on controlling the operation of each one of the plurality of robots using the trained imitation robot control stack model. The plurality of robots being simulated may be the same (or similar) type or model as robot 100, such that the trained imitation robot control stack model 138 may be suitable for use in simulation of the robots. Given that use of the imitation robot control stack model 138 during simulation may require fewer resources than, for instance, use of the robot control stack 230, this may enable efficient training of a robot control policy 330 for applications which involve a plurality of robots (e.g. in a warehouse setting).

In some implementations, training the robot control policy 330 may comprise simulating operation of a second robot based in part on controlling the operation of the second robot using a corresponding second trained imitation robot control stack model and/or a trained second robot control policy. The second imitation robot control stack model and second robot control policy may be trained in much the same way as the imitation robot control stack model 240 and robot control policy 330, as, for instance, described in relation to FIGS. 2 and 3 respectively. In this way, prior training can be leveraged during training of the robot control policy 330. In addition, as mentioned, use of the second imitation robot control stack model during simulation of the second robot may require fewer resources than, for instance, use of a second robot control stack. As such, in this way, efficient training of a robot control policy 330 for robot 100 may be enabled in instances which involve robot 100 interacting with a second, different type of robot (e.g. in an autonomous driving setting involving automated vehicles of different shapes and sizes).

Figure 4:
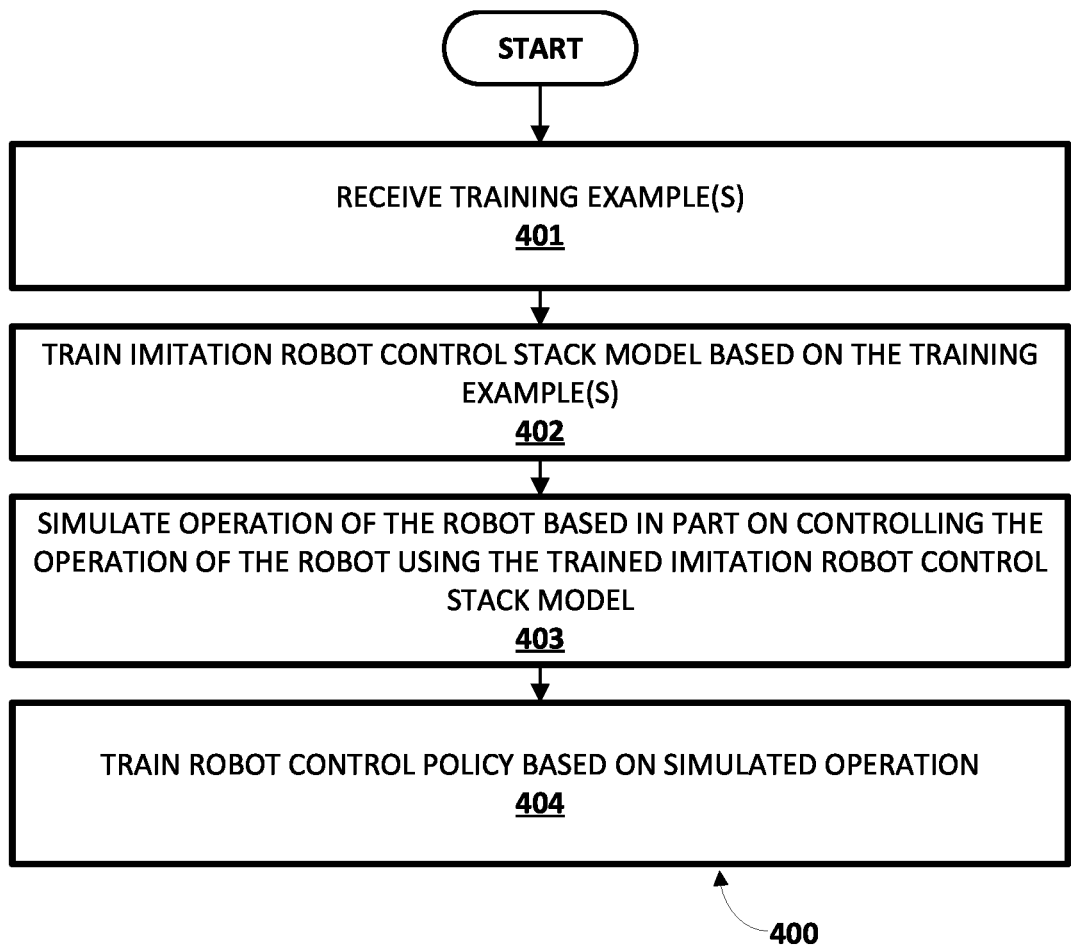
FIG. 4 depicts an example method for practicing selected aspects of the present disclosure.

FIG. 4 depicts an example method for practicing selected aspects of the present disclosure. For convenience, the operations of the flowchart are described with reference to a system that performs the operations. This system may include various components of various computer systems. For instance, some operations may be performed at robot 100, while other operations may be performed by one or more components of simulation system 130. Moreover, while operations of method 400 are shown in a particular order, this is not meant to be limiting. One or more operations may be reordered, omitted or added.

At block 401, the system may receive one or more training examples for training an imitation robot control stack model 240. Each of the one or more training examples may include input data for a robot control stack 230 and output data generated based on processing, by the robot control stack 230, the input data. The input data may include, for instance, (i) a high-level command 220 for controlling a robot 100, and (ii) current state information 210 of the robot 100 and an environment. The output data may include, for instance, a low-level command 231 for controlling the robot 100 according to the high-level command 220.

At block 402, the system may train the imitation robot control stack model 240 based on the one or more training examples. In various implementations, training the imitation robot control stack model 240 may include performing supervised learning based on error between output data of the imitation robot stack model 240 and the output generated by the robot control stack 230. Additionally or alternatively, reinforcement learning may be performed to train the imitation robot control stack model 240 based on rewards or penalties determined from whether particular output data of the imitation robot control stack model 240 is within a threshold similarity to corresponding output data generated by the robot control stack 230 based on the same input data.

At block 403, the system may simulate, e.g. by way of simulation system 130, operation of the robot 100 based in part on controlling the operation of the robot 100 using the trained imitation robot control stack model 138.

In some implementations, the robot 100 may comprise a plurality of components controlled by the robot control stack 230. In this case, the imitation robot control stack model 240 may be trained to determine a low-level command 241 for controlling a subset of the plurality of components of the robot 100 according to the high-level command 220. Further, simulating operation of the robot 100 may include controlling the operation of the simulated robot using the trained imitation robot control stack model 138 and at least one additional trained imitation robot control stack model. The at least one additional imitation robot control stack model may be trained to determine a low-level command for controlling a second subset of the plurality of components of the robot 100 according to the high-level command. In some instances, the first subset and the second subset may not include the same components of robot 100.

At block 404, the system may train a robot control policy 330 for the robot 100 based on the simulated operation. In some implementations, training the robot control policy 330 may include simulating operation of the robot 100 based in part on controlling the operation of the robot 100 using the robot control stack 230. For instance, training the robot control policy 330 may include a first training stage and a second training stage following the first training stage. A proportion of training using the imitation robot control stack model 138 in the first training stage may be higher than a proportion of training using the imitation robot control stack model 138 in the second training stage. Similarly, a corresponding proportion of training using the robot control policy 330 in the second training stage may be higher than in the first training stage.

In various implementations, training the robot control policy 330 may include simulating operation of a plurality of robots based in part on controlling the operation of each one of the plurality of robots using the trained imitation robot control stack model 138. In some other implementations, training the robot control policy 330 may comprise simulating operation of a second robot based in part on controlling the operation of the second robot using a corresponding second trained imitation robot control stack model. In various implementations, techniques such as reinforcement learning may be used to train the robot control policy 330, e.g., based on rewards and/or penalties that are accumulated during simulation.

Figure 5:
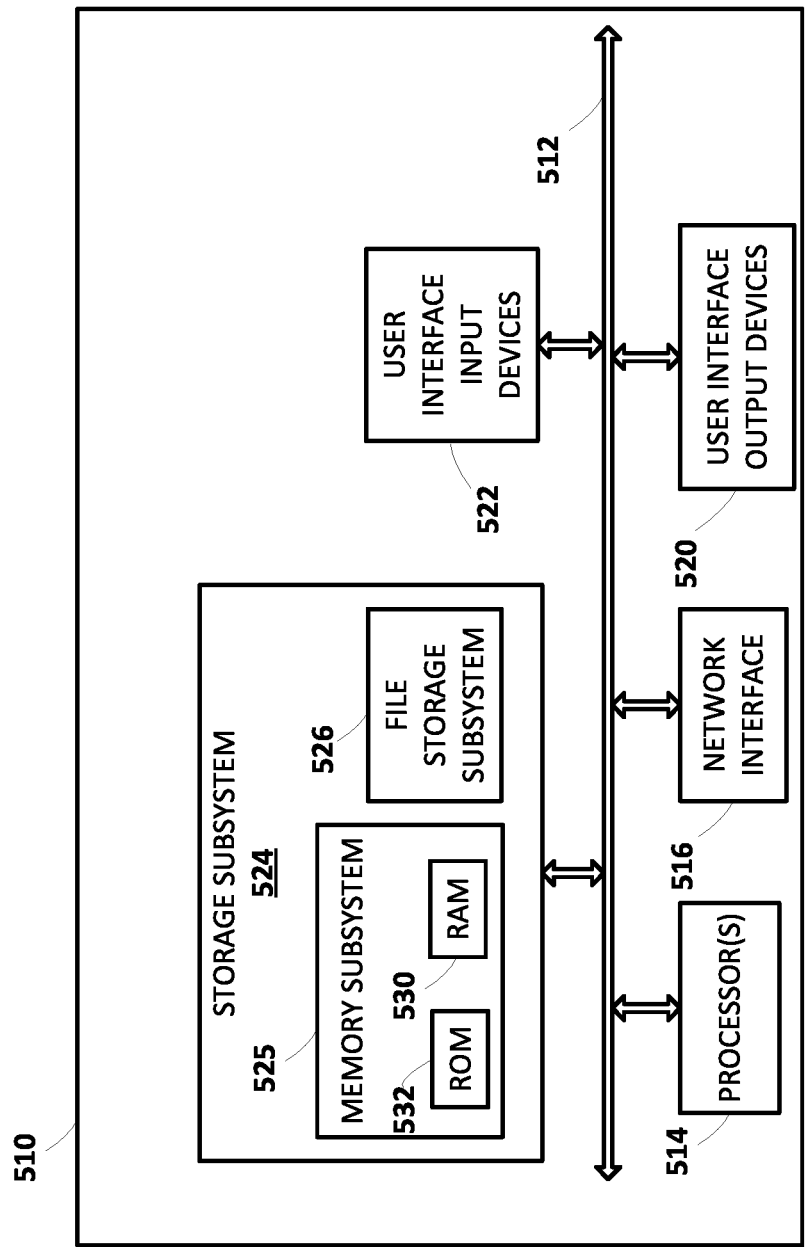
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system. Storage subsystem 524 stores programming and data constructs that provide the functionality of some or all of the modules described herein. For example, the storage subsystem 524 may include the logic to perform selected aspects of method 400, and/or to implement one or more aspects of robot 100 or simulation system 130. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple buses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    receiving one or more training examples for training an imitation robot control stack model, each of the one or more training examples comprising:
        input data to a real robot control stack, wherein the input data comprises (i) a high-level command for controlling a robot that implements the real robot control stack, and (ii) current state data of the robot and an environment, and
        output data generated based on processing, by the real robot control stack, the input data to the real robot control stack, wherein the output data comprises actuator signals for controlling the robot according to the high-level command;
    training the imitation robot control stack model based on the one or more training examples to imitate operation of the real robot control stack;
    simulating operation of the robot based in part on controlling the operation of the robot by using the trained imitation robot control stack model to generate actuator signals for the robot; and
    based on the simulated operation using the trained imitation robot control stack model, training a robot control policy to generate additional high-level commands.

2. The method of claim 1, wherein training the robot control policy further comprises simulating operation of the robot based in part on controlling the operation of the robot using the real robot control stack.

3. The method of claim 2, wherein training the robot control policy comprises a first training stage and a second training stage following the first training stage, wherein a proportion of training using the imitation robot control stack model in the first training stage is higher than a proportion of training using the imitation robot control stack model in the second training stage.

4. The method of claim 1, wherein training the robot control policy comprises simulating operation of a plurality of robots based in part on controlling the operation of each one of the plurality of robots using the trained imitation robot control stack model.

5. The method of claim 1, wherein training the robot control policy further comprises simulating operation of a second robot based in part on controlling the operation of the second robot using a corresponding second trained imitation robot control stack model.

6. The method of claim 1, wherein training the imitation robot control stack model comprises performing reinforcement learning to train the imitation robot control stack model based on rewards or penalties determined from whether a particular actuator signal determined by the imitation robot control stack model is within a threshold similarity to a corresponding actuator signal generated by the robot control stack based on the same high-level command.

7. A method implemented using one or more processors, comprising:
    receiving one or more training examples for training an imitation robot control stack model, each of the one or more training examples comprising:
        input data to a robot control stack, wherein the input data comprises (i) a high-level command for controlling a robot, and (ii) current state data of the robot and an environment, and
        output data generated based on processing, by the robot control stack, the input data to the robot control stack, wherein the output data comprises a low-level command for controlling the robot according to the high-level command;
    training the imitation robot control stack model based on the one or more training examples; and
    simulating operation of the robot based in part on controlling the operation of the robot using the trained imitation robot control stack model;
    wherein training the imitation robot control stack model is based on determining whether a next state of the robot and the environment if the robot is controlled according to a particular low-level command determined by the imitation robot control stack model is within a threshold similarity to a corresponding next state if the robot is controlled according to a low-level command generated by the robot control stack based on the same high-level command.

8. The method of claim 7, wherein the robot comprises a plurality of components controlled by the real robot control stack, and the imitation robot control stack model is trained to determine, based on processing an input high-level command and current state data of the robot and the environment, a low-level command for controlling a subset of the plurality of components of the robot according to the high-level command.

9. The method of claim 8, wherein simulating operation of the robot comprises controlling the operation of a simulated robot using the trained imitation robot control stack model and at least one additional trained imitation robot control stack model, wherein the at least one additional trained imitation robot control stack model has been trained to determine, based on processing an input high-level command and current state data of the robot and the environment, a low-level command for controlling a second subset of the plurality of components of the robot according to the high-level command.

10. A system comprising one or more processors and memory storing instructions that, in response to execution by the one or more processors, cause the one or more processors to:
receive one or more training examples for training an imitation robot control stack model, each of the one or more training examples comprising:
input data to a real robot control stack, wherein the input data comprises (i) a high-level command for controlling a robot that implements the real robot control stack, and (ii) current state data of the robot and an environment, and
output data generated based on processing, by the real robot control stack, the input data to the real robot control stack, wherein the output data comprises actuator signals for controlling the robot according to the high-level command;
train the imitation robot control stack model based on the one or more training examples to imitate operation of the real robot control stack;
simulate operation of the robot based in part on controlling the operation of the robot by using the trained imitation robot control stack model to generate actuator signals for the robot; and
based on the simulated operation using the trained imitation robot control stack model, training a robot control policy to generate additional high-level commands.

11. The system of claim 10, wherein training the imitation robot control stack model comprises performing reinforcement learning to train the imitation robot control stack model based on rewards or penalties determined from whether a particular actuator signal determined by the imitation robot control stack model is within a threshold similarity to a corresponding actuator signal generated by the real robot control stack based on the same high-level command.

12. The system of claim 10, wherein training the imitation robot control stack model comprises performing reinforcement learning to train the imitation robot control stack model based on rewards or penalties determined from whether a next state of the robot and the environment if the robot is controlled according to a particular actuator signal determined by the imitation robot control stack model is within a threshold similarity to a corresponding next state if the robot is controlled according to a actuator signal generated by the real robot control stack based on the same high-level command.

13. The system of claim 10, wherein the robot comprises a plurality of components controlled by the real robot control stack, and the imitation robot control stack model is trained to determine, based on processing an input high-level command and current state data of the robot and the environment, a low-level command for controlling a subset of the plurality of components of the robot according to the high-level command.

14. The system of claim 13, wherein simulating operation of the robot comprises controlling the operation of a simulated robot using the trained imitation robot control stack model and at least one additional trained imitation robot control stack model, wherein the at least one additional trained imitation robot control stack model has been trained to determine, based on processing an input high-level command and current state data of the robot and the environment, a low-level command for controlling a second subset of the plurality of components of the robot according to the high-level command.

15. The system of claim 10, wherein training the robot control policy further comprises simulating operation of the robot based in part on controlling the operation of the robot using the real robot control stack.

16. The system of claim 15, wherein training the robot control policy comprises a first training stage and a second training stage following the first training stage, wherein a proportion of training using the imitation robot control stack model in the first training stage is higher than a proportion of training using the imitation robot control stack model in the second training stage.

17. The system of claim 10, wherein training the robot control policy comprises simulating operation of a plurality of robots based in part on controlling the operation of each one of the plurality of robots using the trained imitation robot control stack model.

18. A method implemented using one or more processors, comprising:
simulating operation of a robot based in part on controlling operation of the robot using a trained imitation robot control stack model, wherein the trained imitation robot control stack model is trained, using a plurality of training examples, to approximate a real robot control stack, each of the one or more training examples comprising:
input data to the real robot control stack, wherein the input data comprises (i) a high-level command for controlling the robot, and (ii) current state data of the robot and an environment, and
output data generated based on processing, by the real robot control stack, the input data to the real robot control stack, wherein the output data comprises an actuator signal for controlling the robot according to the high-level command; and
training a robot control policy to generate additional high-level commands for the robot based on the simulated operation.

* * * * *